United States Patent [19]

Yabushita et al.

[11] Patent Number: 4,641,237
[45] Date of Patent: Feb. 3, 1987

[54] BUS CONTROL METHOD AND APPARATUS

[75] Inventors: Masaharu Yabushita, Sagamihara; Makoto Nohmi, Kawasaki; Nobuyuki Fujikura, Kawasaki; Shoji Miyamoto, Kawasaki; Hirokazu Ihara, Machida, all of Japan

[73] Assignee: Hitachi, Ltd., Tokyo, Japan

[21] Appl. No.: 530,078

[22] Filed: Sep. 7, 1983

[30] Foreign Application Priority Data

Sep. 7, 1982 [JP]  Japan .................................. 57-156143

[51] Int. Cl.[4] .................... G06F 13/14; G06F 13/40
[52] U.S. Cl. .................................................. 364/200
[58] Field of Search ... 364/200 MS File, 900 MS File

[56]  References Cited
U.S. PATENT DOCUMENTS 4,320,452  3/1982  Kempf et al. ..................... 364/200
4,384,327  5/1983  Conway et al. .................... 364/200
4,390,944  6/1983  Quackenbush ..................... 364/200
4,511,959  4/1985  Nicolas et al. ..................... 364/200

Primary Examiner—David Y. Eng
Attorney, Agent, or Firm—Antonelli, Terry & Wands

[57]  ABSTRACT

A bus control method and apparatus wherein buses each coupling a pair of processors are serially arranged rectilinearly into a cluster bus which is arranged in one direction and wherein a plurality of such cluster buses are arranged in a plurality of directions as a lattice pattern to form a multiprocessor system. Each of the processors supplies the respective cluster buses with send request and priority processing level signals and receives a receipt acknowledge signal from another processor on the same cluster bus, thereby to occupy said cluster bus, so as to transfer data to the other processor on the cluster bus.

6 Claims, 18 Drawing Figures

BUS CONTROL METHOD AND APPARATUS

BACKGROUND OF THE INVENTION

The present invention relates to a bus control method and apparatus. More particularly, it relates to a bus control method and apparatus for a multiprocessor setup which dispenses with a bus arbiter for controlling a common bus and which affords a high reliability and permits maintenance in operation.

One of the most recent trends in information processing by a computer is the conversion from centralized processing to decentralized processing. By way of example, when the computer is divided into an OS processor for executing an operating system program, a task processor for executing users' tasks, a communication processor, etc., and a plurality of different types of programs are simultaneously run, the number of programs to be run in parallel with each processor decreases, and hence, the response rate rises.

As shown in FIG. 1, a conventional multiprocessor setup for such decentralized processing is furnished with a single bus 1 for a plurality of processors (CPUs) 11 - 1n and also requires a bus arbiter 2 for controlling the mastership of the bus 1.

However, when the single bus 1 is directly coupled to the respective CPUs, and the bus arbiter 2 is also directly connected in this manner, there is the disadvantage that the whole system becomes inoperative due to an abnormality which may occur in only one CPU or in the bus arbiter 2. As the number of processors in the system increases, the reliability of the system becomes lower. Further, since all of the processors are coupled by the same bus 1, maintenance is impossible during operation of the system.

SUMMARY OF THE INVENTION

An object of the present invention is to provide a bus control method and apparatus which, in order to eliminate these disadvantages of the prior art, dispenses with a bus arbiter for controlling the commmpon bus of a multiprocessor system, thereby to secure a high reliability and provide for maintainability of the system.

The present invention is characterized in that a plurality of buses, each of which couples a pair of processors, are serially arranged rectilinearly into one cluster bus, such cluster bus or buses being arrayed in one direction or in a plurality of directions as a lattice pattern when viewed in plan, so as to form a multiprocessor system, and that each processor delivers a send request and a priority processing level signal to every corresponding cluster bus and receives a receipt acknowledge signal from another processor belonging to the same cluster bus, thereby to occupy the cluster bus and to transfer data to the other processor of the cluster bus.

The invention is also characterized in that each of the processors is connected to the cluster bus through a bus control device which consists of I/O ports and a relay bus control unit.

DETAILED DESCRIPTION OF THE PREFERRED EMBODIMENTS

The present invention is characterized in that a pair of processors are coupled by a single bus, that a plurality of buses are successively arrayed rectilinearly into one cluster bus which is arranged in one direction, and that a plurality of such cluster buses may be arranged in a plurality of directions as a lattice pattern when viewed in plan.

Figure 2:
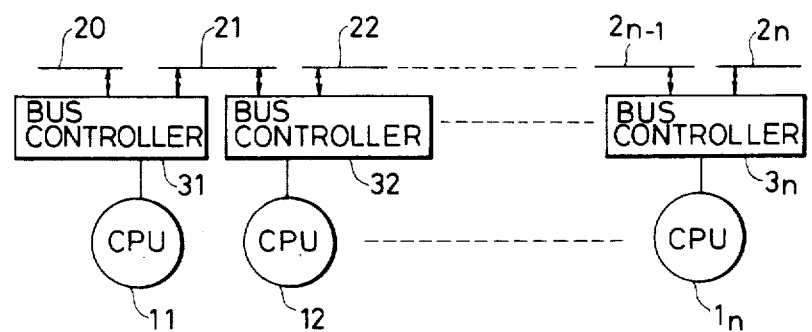
FIG. 2 is a basic setup diagram of an embodiment of a multiprocessor system according to the present invention.

FIG. 2 illustrates one cluster bus, which is formed by coupling a pair of processors 11 and 12 by means of a bus 21, coupling processors 12 and 13 by means of a bus 22, and similarly coupling processors up to 1n in succession.

Figure 1:
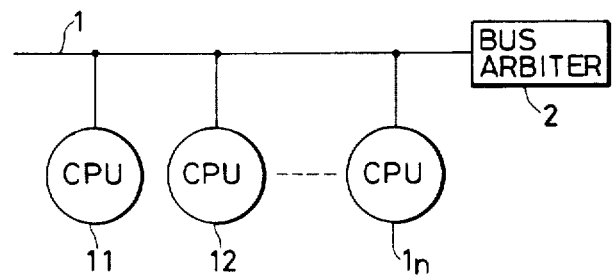
FIG. 1 is a setup diagram of a conventional multiprocessor system.

With the conventional multiprocessor system, all the processors 11 - 1n are coupled on the identical bus 1 as shown in FIG. 1. Therefore, when any of the processors has become disabled for any reason, all the other processors 11 - 1n are adversely affected, and the system as a whole goes down.

In contrast, according to the present invention, owing to the use of the cluster bus system, the processors are connected at 1-to-1 on the identical cluster bus hardware-wise, so that even when any of the processors has become disabled, the processors nearby sense the abnormality and disconnect from the abnormal processor, whereby the normal functions of the overall system are maintained. In addition, since the bus arbiter, which forms a bottleneck in the prior art system, is unnecessary, the reliability of the system as a whole is enhanced by elimination of this circuit. Furthermore, since both the adjacent processors on the identical bus can sense the abnormality therebetween, maintenance of the abnormal processor is permitted even during operation of the system, thereby to enhance the maintainability thereof.

Unless one cluster bus includes a processor in the down status therein, it is connected rectilinearly, so that data can be simultaneously sent from one processor to other processors on the same cluster bus.

Since, in FIG. 2, one cluster bus is divided by n processors, each of the (n−1) individual buses or portions of the cluster bus couple one pair of processors. The respective processors are furnished with bus controller devices 31 - 3n, which are successively and serially connected to be rectilinear by means of the cluster bus (at 20 - 2n). In response to bus control signals delivered from the corresponding processors, the bus controller devices 31 - 3n send and receive signals and data between the processors or relay them. Under the control of the bus controller devices 31 - 3n, the individual buses 20 - 2n operate as if they were a single bus.

Figure 3:
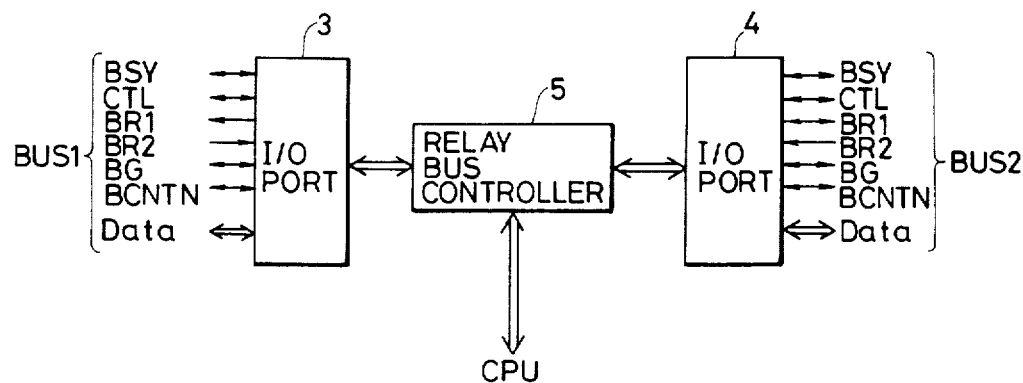
FIG. 3 is a setup diagram of an embodiment of a bus control device according to the present invention.

FIG. 3 is a schematic diagram showing the essential elements of the bus controller device in accordance with an embodiment of the present invention. As illustrated in FIG. 3, the bus controller device is constructed of two input/output ports 3, 4 for inputting and outputting bus control signals and data, and a relay bus controller unit 5 for inputting/outputting the data into/-from the processor in correspondence with the bus control signals. The individual arrangements of the input/output ports 4, 6 and the relay bus controller unit 5, and their logic circuit diagrams, are respectively shown in FIGS. 4 and 5.

Figure 4:
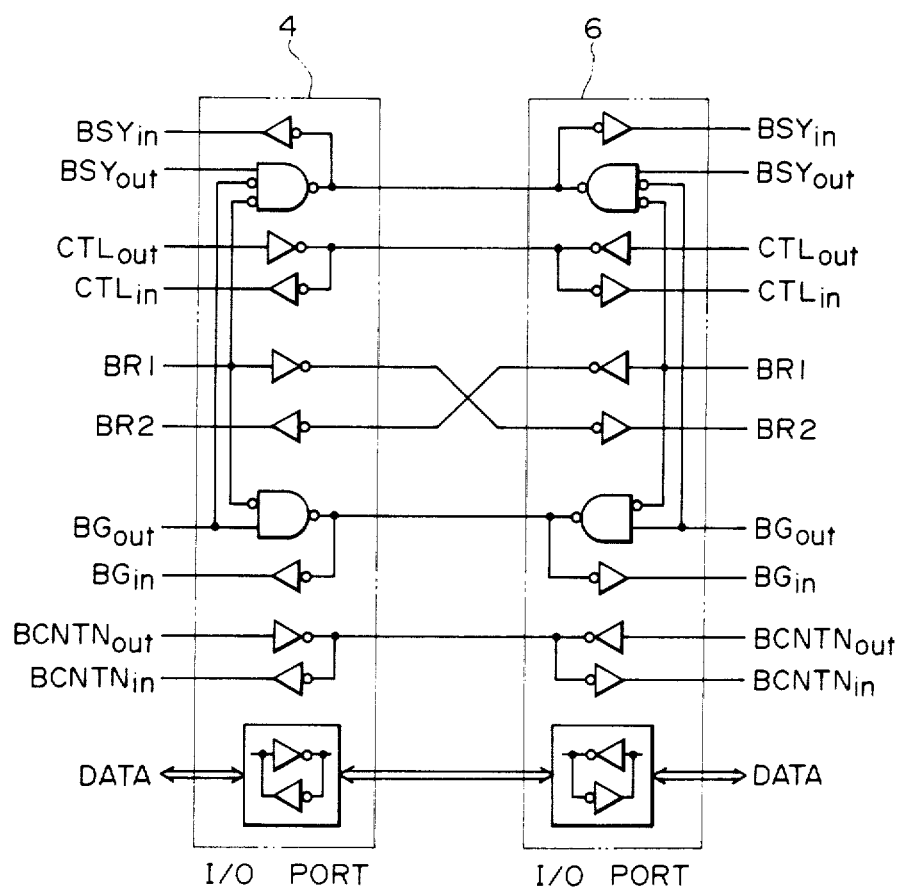
FIGS. 4 and 5 are schematic logic arrangement diagrams of I/O ports and a relay bus control unit according to the present invention, respectively.

As shown in FIG. 4, I/O ports 4, 6 are bidirectional and parallel ports which handle parallel data, and each of which is constructed of a plurality of signal buffers. Each of the I/O ports 4, 6 is the respective input or output port of the adjacent processor. The I/O ports 4, 6 exchange data and bus control signals BSY, CTL, BR1, BR2, BG and BCNTN with adjacent I/O ports 3, 7 through the buses, as will be described later in conjunction with FIG. 6.

Among the bus control signals, the busy signal BSY is a signal which indicates that the particular bus is being used. The control signal CTL indicates a bus transfer mode. When this signal is "1", a control for establishing a bus mastership is performed, that is, this period is the period of a control (CTL) mode. During the period during which this signal is "0", data is being transferred by the particular bus. In addition, the bus request signal BR1 is a first signal for making a send request from one processor through the bus control device to any processor which is directly connected to the same bus as that of the one processor, while the bus request signal BR2 is a second signal for making a send request from another processor which is connected to the same bus as that of the one processor. The bus grant signal BG is an acknowledge signal for the send request signal BR1 or BR2. Further, the bus signal BCNTN is a bus contention signal which indicates that send requests have been simultaneously generated by at least two processors.

The relay bus controller unit 5 takes the OR condition of the input signals from each port 3 or 4 (except for the bus grant signal BG) and relays them to the processor. As regards the bus grant signal BG only, the AND comparison of the input from each port 3 or 4 is taken and is relayed to the processor. The relay bus controller unit 5 and the processor 11 control these bus control bus signals.

Figure 5:
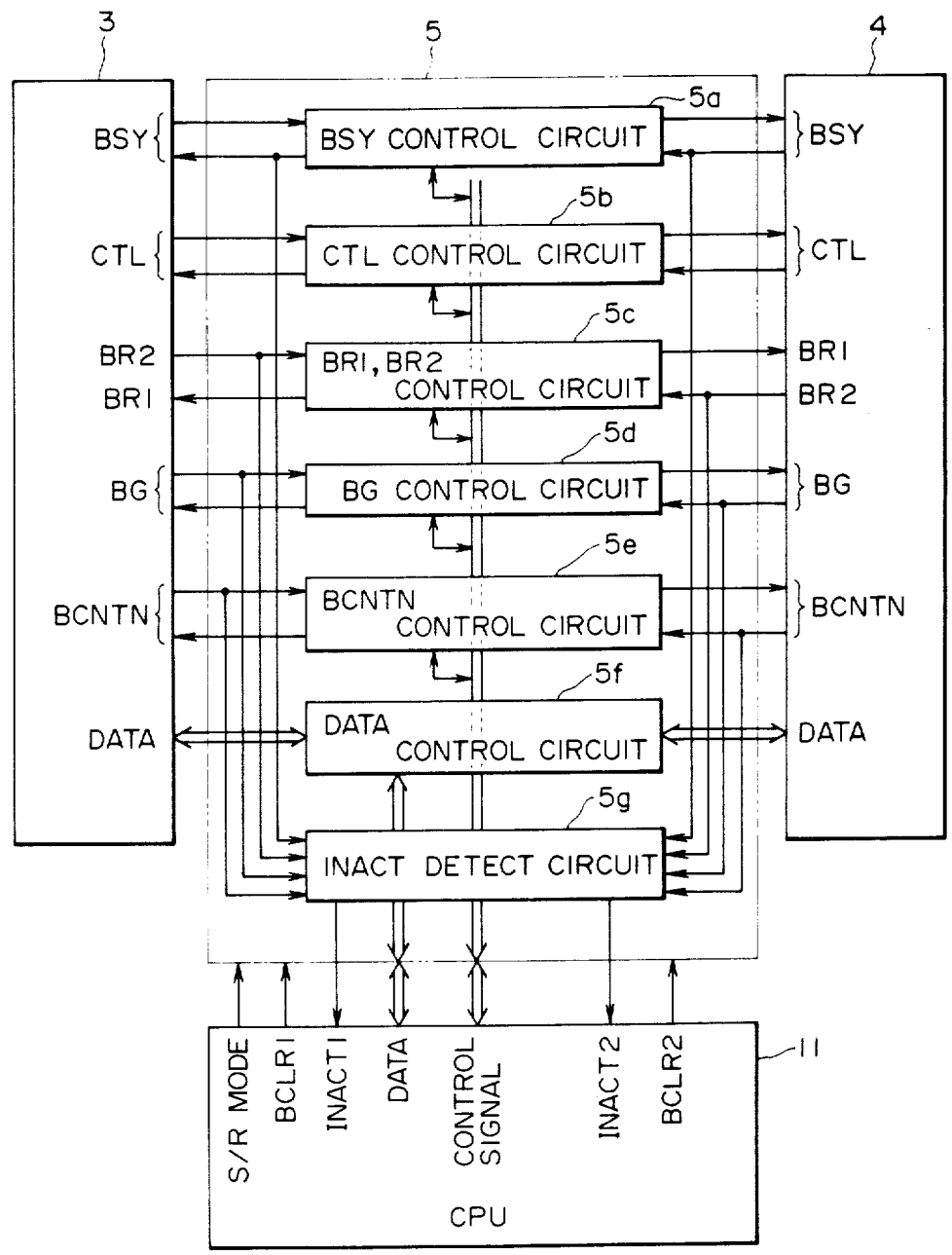

FIG. 5 illustrates the configuration of the relay bus controller unit, which is composed of busy signal (BSY) control circuit 5a, control signal (CTL) control circuit 5b, bus request signal (BR1, BR2) control circuit 5c, bus grant signal (BG) control circuit 5d, bus contention signal (BCNTN) control circuit 5e, data bus (DATA) control circuit 5f and inactive detect signal (INACT) control circuit 5g.

The relay bus control unit 5 takes the OR condition of the input signals from each port 3 or 4, except the bus grant signal (BG), and relays them to the processor. As regards the bus grant signal BG only, and AND condition of the input from each port 3 or 4 is taken and is relayed to the processor.

The control circuits from the busy signal (BSY) control circuit 5a through the data bus (DATA) control circuit 5f will be described in order with reference to FIGS. 11 through 16.

Figure 11:
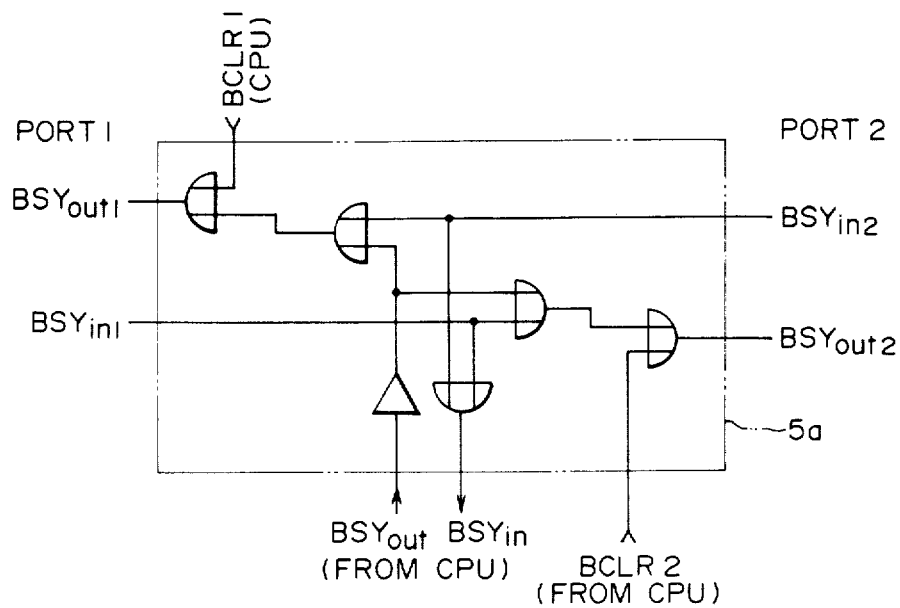
FIG. 11 is a schematic circuit diagram of the BSY control circuit of FIG. 5.

FIG. 11 illustrates the busy signal (BSY) control circuit 5a. The busy signal BSYin1 input from the port 3 and the busy signal BSYin2 input from the port 4 are subjected to an OR operation by gate G1 and delivered to the processor 3. The busy signal BSY output from the processor and the busy signal BSYin1 input from the port 3 or the busy signal BSYin2 input from the port 4 are subjected to an OR operation by gates G2 and G3, respectively, and delivered to the port opposite to the input port. At the same time, whenever either the bus grant signal BG or the bus request signal BR1 is delivered to a respective port, the busy signal BSY signal supplied to that port is inhibited (refer to FIG. 4).

Figure 12:
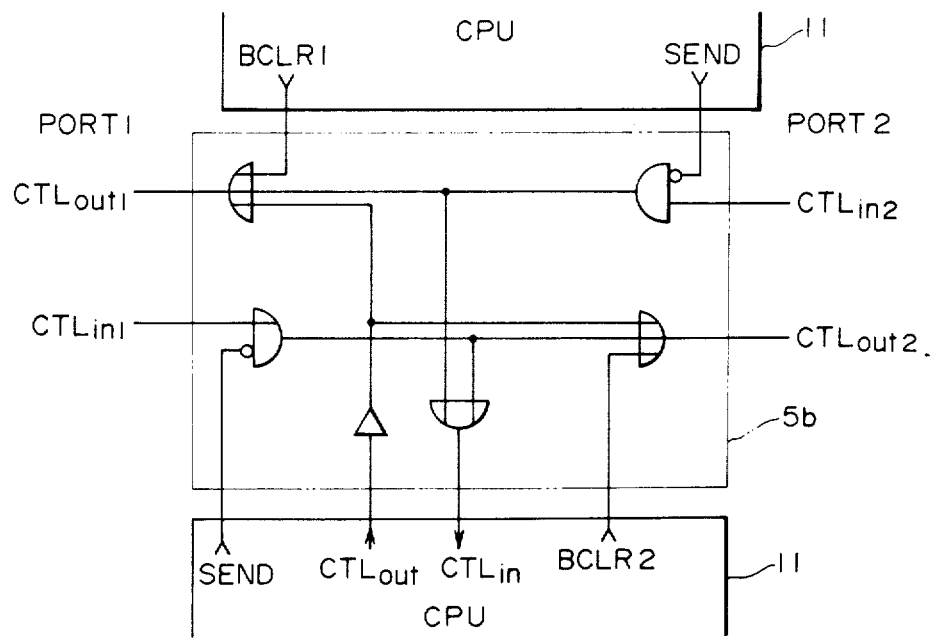
FIG. 12 is a schematic circuit diagram of the CTL control circuit of FIG. 5.

Next, FIG. 12 illustrates the control (CTL) signal control circuit 5b. The processor 11 delivers sending and receiving mode signals S/R MODE to the relay control unit 5 (FIG. 5) and the status of the relay control unit 5 becomes either the sending mode or the receiving mode. When the sending and receiving mode signal S/R MODE is 'SEND', the control signal CTL is blocked at gates G6 and G7 in the relay control unit 5. That is, the sending side takes the initiative in deciding if the status is the control mode or the data transfer mode.

Therefore, the relay control unit connected to the processor whose status is the receive mode relays and delivers the control signal CTL from the port 3 to port 4 or from port 4 to port 3, as the case may be. As to the logic of such relaying operation, the control signal CTL inputs of both the port 3 and 4 are subjected to an OR operation and delivered to the control signal CTL input of the processor via gate 68 as in the case of the busy signal BSY. Also, the control signal CTL output from the processor and the control signal CTL input of each port (CTLin1 or CTLin2) are subjected to an OR operation and delivered via gates G9 or G10 to the port opposite to the input port.

Figure 13:
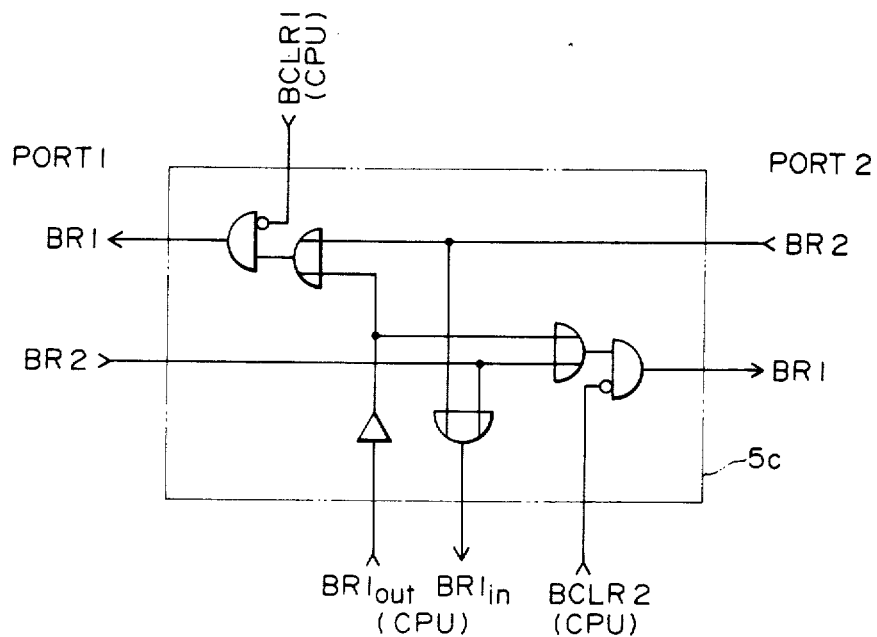
FIG. 13 is a schematic circuit diagram of the BR control circuit of FIG. 5.

FIG. 13 illustrates the control circuit 5e for control of the bus request signals BR1 and BR2. The bus request signals BR1 and BR2 differ from the others in that the bus request signal BR1 is an input signal and the bus request signal BR2 is an output signal of the port. That is, the bus request signal BR2 inputs from each port are subjected to an OR operation and delivered to the processor as the bus request signal BR1 input of the processor via gate G11. The bus request signal BR1 output of the processor and the bus request signal BR2 input from each port 3, 4 are subjected to an OR operation and delivered to the port opposite to the input port via gates B12, B13 on the one hand, and gates G14, G15 on the other hand.

Figure 14:
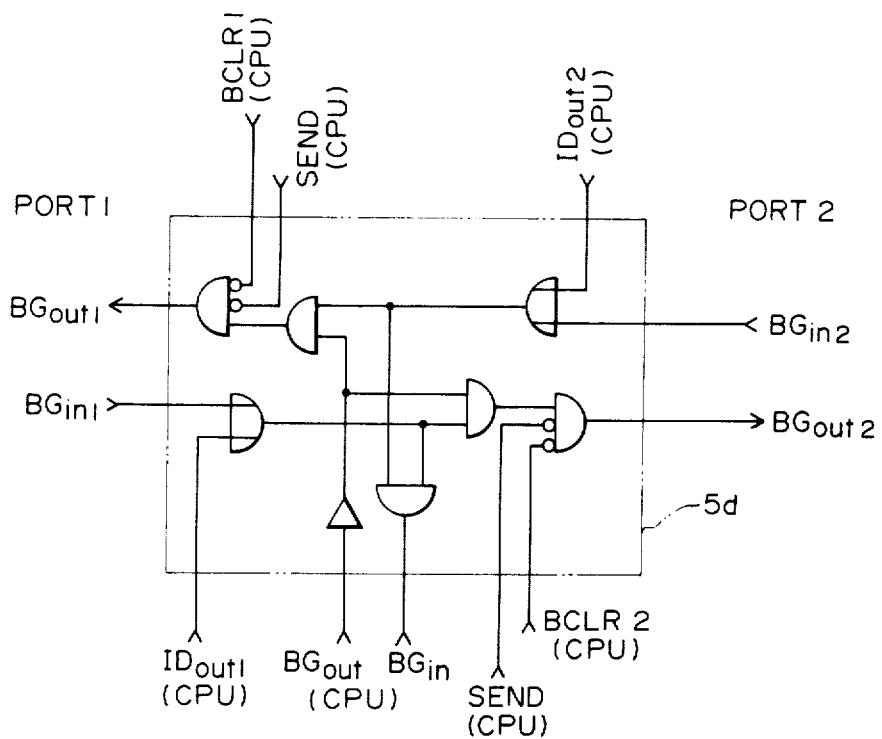
FIG. 14 is a schematic ciruit diagram of the BG control circuit of FIG. 5.

FIG. 14 illustrates the bus grant signal BG control circuit 5d. As regards the bus grant signal BG only, when the bus request signal BR1 output of the processor is delivered to each port 3, 4, the bus grant signal BG inputs from both the ports are delivered to the processor as the bus grant signal BG input of the processor in the sending mode, for synchronizing data transfer. That is, the bus grant signal BG inputs of both the ports supplied via gates G16 and G17 and subjected to an AND operation by gate G18 and the output is delivered to the processor as the bus' grant signal BG input of the processor. However, in the sending mode the processor which is on the sending side neither delivers the bus grant signal BG nor relays a signal. Therefore, in the case of the sending and receiving mode S/R mode being 'SEND', the bus grant signal BG output of the processor is inhibited at gates G19 and G20. Next, in the case of the sending and receiving mode S/R MODE being 'RECEIVE', when the relay control unit 5 receives the bus request signal BR2, the processor 11 receives this signal as the bus request signal BR1, as seen in FIG. 13, which bus request signal BR1 is relayed to the port opposite to the input port, and the bus grant signal BG output of the processor 11 is delivered to the relay control unit 5. In the bus grant signal BG control circuit 5d of the relay control unit 5, the bus grant signal BG is input from the port opposite to the port to which the bus request signal BR2 is delivered, and the bus grant signal BG output is subjected to an AND operation by gate G21 or G22 and is delivered to the adjacent port.

Figure 15:
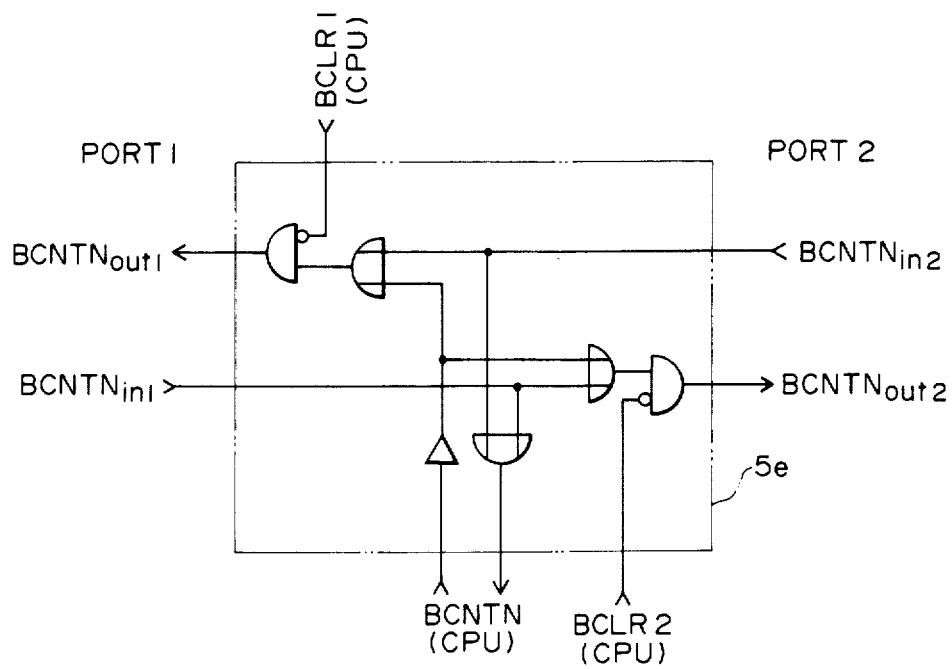
FIG. 15 is a schematic circuit diagram of the BCNTN control circuit of FIG. 5.

FIG. 15 illustrates the bus contention signal BCNTN control circuit 53. The bus contention signal BCNTN inputs of both the ports 3, 4 are subjected to an OR operations at gate G23 and delivered to the processor 11. The bus contention signal BCNTN output of the processor 11 and the bus contention signal BCNTN input of each port are subjected to an OR operation by gates G24 and G25 and delivered via respective gates G26 and G27 to the port opposite to the input port.

Figure 16:
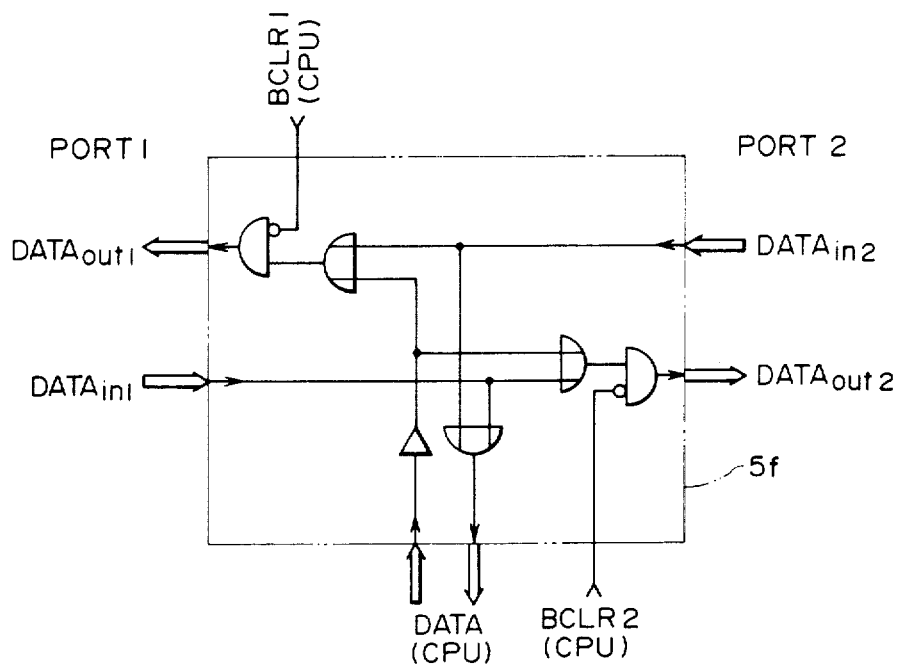
FIG. 16 is a schematic circuit diagram of the data control circuit of FIG. 5.

FIG. 16 illustrates the data control circuit 5f. The data bus data inputs of both the ports 3, 4 are subjected to an OR operation via gate G28 and delivered to the processor 11 as the data bus data input of the processor. The data bus data output of the processor and the data bus data input of each port are subjected to an OR operation by gates G29 and G30 and delivered via respective gates G31 and G32 to the port opposite to the input port.

Figure 17:
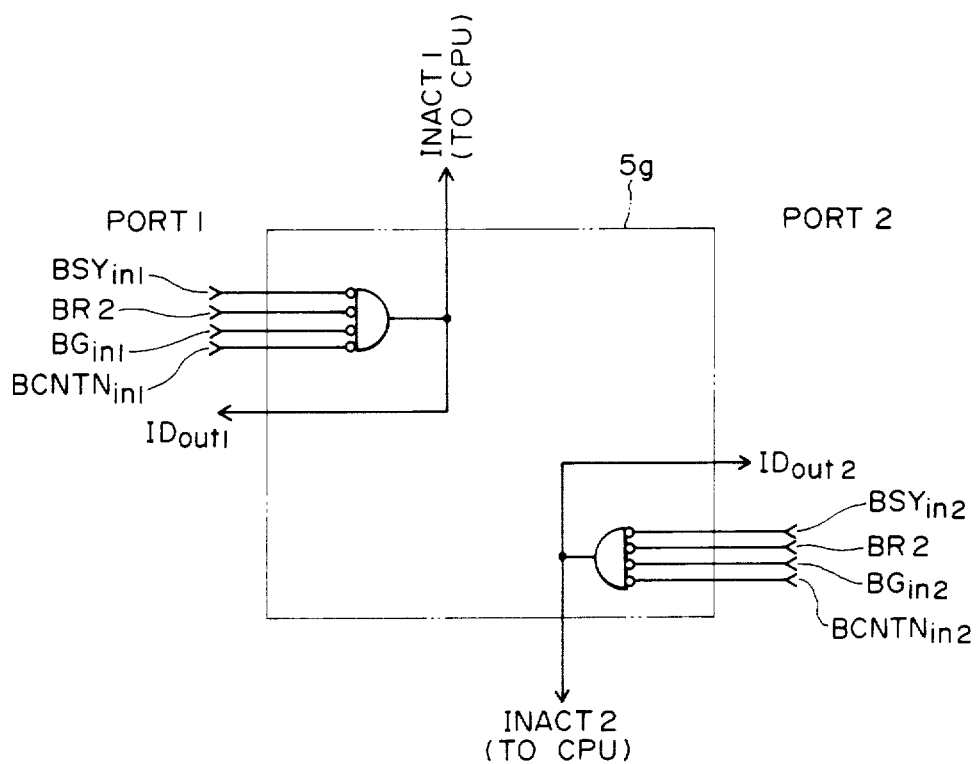
FIG. 17 is a schematic circuit diagram of the INACT detect circuit of FIG. 5.

FIG. 17 illustrates the inactive detect signal INACT control circuit 5g. Whenever none of the four bus control input signals (BSYin, BR2, BGin, BCNTNin) is generated in the respective port, the inactive detect signal INACT output (INACT1 in the port 1, INACT2 in the port 2) is delivered via gate G33 or G34 to the processor 11. The inactive detect signal INACT output of the relay control unit 5 is delivered to the processor 11, and the processor 11 detects that the input port which delivers the inactive detect signal INACT is an inactive port, which is cleared (output BSY=1, CTL=1, BR1=0, BG=0, BCNTN=0, DATA=(00)16) by the bus clear signal (BCLR1 or BCLR2) through the relay control unit. In addition, the bus grant signal BGin input from the port in which the inactive detect signal INACT is detected and the inactive detect output signal IDout (IDout1 in the port 1 or IDout2 in the port 2) are subjected to an OR operation at gates G16, G17 and delivered to the port opposite to the input port (refer to FIG. 14). Thus, the bus grant signal BG answered to the bus request signal BR1 is successively relayed and delivered from the inactive port to the sending processor.

Figure 6:
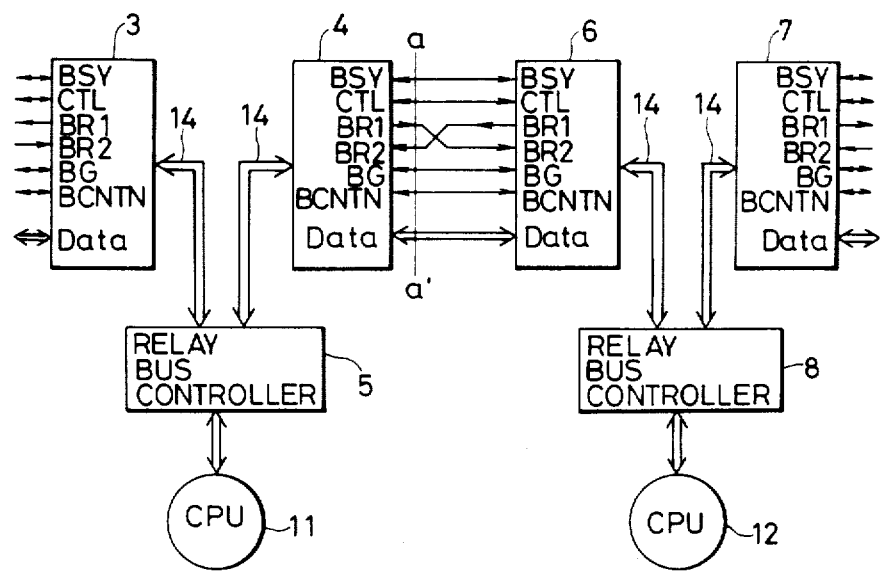
FIGS. 6, 7 and 8 are a connection diagram of a multiprocessor system showing an embodiment of the present invention, a signal time chart at the time at which a send request has been issued from one processor and a signal time chart at the time at which send requests have contested, respectively.
Figure 7:
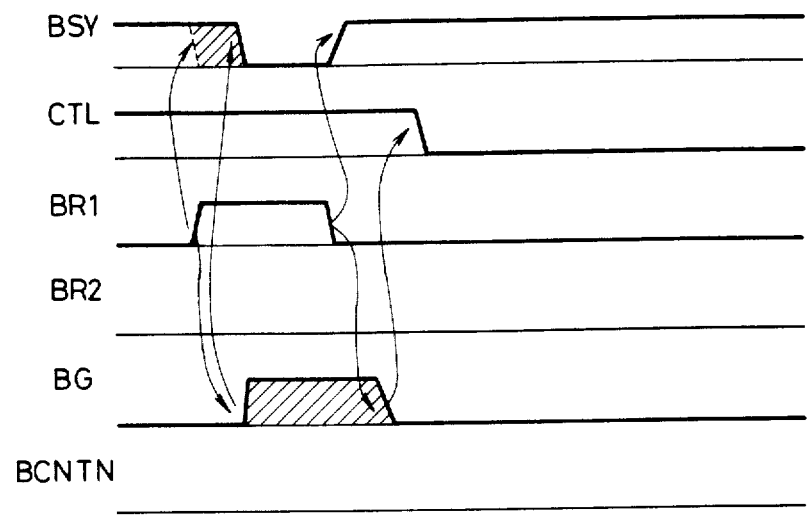
Figure 8:
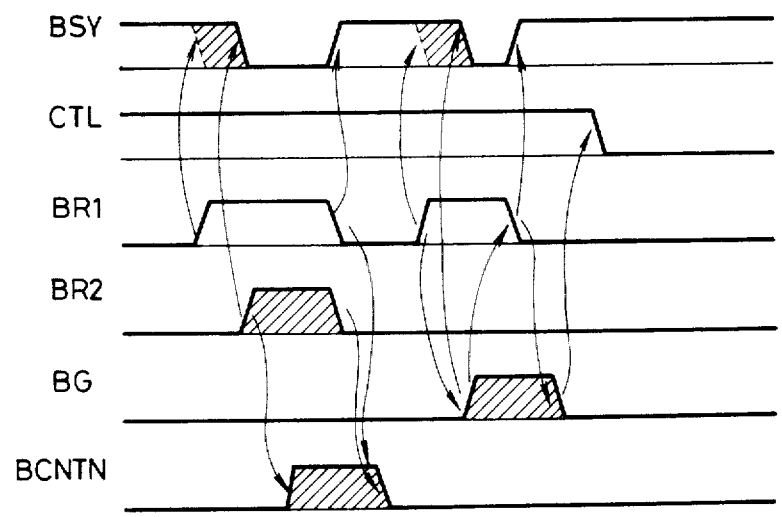

FIGS. 6, 7 and 8 are schematic diagrams of a multiprocessor system showing an embodiment of the present invention, a signal time chart at the time at which a send request has been issued from only one processor and a signal time chart at the time at which send requests are in contention on a bus, respectively.

In order to simplify the operations of the bus control signals, FIG. 6 relates to the bus control for a case where n=2 holds in FIG. 2; namely, a multiprocessor system which consists of only two processors 11 and 12. As shown in FIG. 6, this multiprocessor system includes only one bus which connects the port 4 of a processor 11 and the port 6 of a processor 12. The processor 11 has two ports 3, 4 and a relay bus controller unit 5, while the other processor 12 has two ports 6, 7 and a relay bus controller unit 8. As indicated at a-a' in FIG. 6, the bus connects the port 4 of the processor 11 and the port 6 of the processor 12 to transmit signals identical to each other between the processor 11 and 12, except that only signal terminals BR1 and BR2 are connected in a manner to cross each other, the terminals BR1 being connected to the opposite terminals BR2, as shown.

As indicated by the directions of arrows in FIG. 4 and 6, the bus transmits data and the bus control signals, except BR1 and BR2, bidirectionally. The mutual bus control signals sent from the respective ports 4, 6 become ORed on the bus. That is, when "1" is transmitted from either port, the control signal on the bus becomes "1". Now, when data is generated in one processor 11, this processor first supplies the relay bus controller unit 5 with a second request signal BR1out (FIG. 13), thereby intending to establish a bus mastership and to start data transfer.

FIG. 7 illustrates a bus control sequence in the case where the processor 11 in FIG. 6 is at the sending side. When the send request has been issued from the processor 11 to the relay bus controller unit 5 as seen in FIG. 13, this relay bus controller unit 5 supplies the two ports 3, 4 with the send request signal via OR gates G12 and G14. In FIG. 6, the port 3 is the end terminal of the bus and therefore has no opposite port to send a signal to in the example under consideration. As illustrated in FIG. 4, a port has the function of suppressing the delivery of the busy signal BSY and bus grant signal BG onto the bus from the opposite port at the same time that the send request signal BR1 from the relay bus controller unit 5 is sent thereto. In this case, the busy signal BSY is cut off because of the absence of an opposite port to be supplied with a signal.

Herein, in order to detect the presence or absence of an opposite port, the INACT detect circuit 5g in the relay bus controller unit 5 monitors the busy signal BSY, send request signal BR2 and bus grant signal BG and bus contention signal BCNTN as the bus control signals of the opposite port for a predetermined period of time, as seen in FIG. 17. Upon detecting that none of these signals exists, the relay bus controller unit 5 decides that the opposite port is inactive and immediately cuts the bus. That is, the relay bus controller unit 5 cuts off the inputs/outputs of the bus in relation to the port 3 and assumes that the bus grant signal BG has been received from the inactive port 3. The bus-cut port 3 is supplied with only the busy signal BSY and control signal CTL in order to inhibit any port which may be connected to the port 3 later from using the bus.

On the other hand, the relay bus controller unit 5 supplies the send request signal BR1 to the port 4 as well in a quite similar manner. Herein, no inaction signal is detected because any of the busy signal BSY, send request signal BR2, bus grant signal BG and bus contention signal BCNTN will be sent back from the opposite port 6.

Next, the relay bus controller unit 8 of the processor 12 receives the send request signal BR1 delivered by the port 4 of the processor 12 in the form of the opposite request signal BR2 of the port 6, and it performs the operation of detecting the presence of inaction of the opposite port 4 as in the case of the processor 11. In addition, the relay bus controller unit 8 relays the received send request signal BR2 to the port 7 as the send request signal BR1, as seen in FIG. 13. Similarly to the foregoing case of the port 3, the relay bus controller unit 8 performs the inaction detecting operation as to the port 7. Thus, the unit 8 decides that the port 7 is inactive and cuts it from the bus. Simultaneously, the unit 8 cuts off the busy signal BSY from the port 6 and releases the bus to the opposite port 4.

FIG. 7 illustrates this sequence more in detail, and indicates the signal order as viewed along the line a-a' in FIG. 6. In FIG. 7 parts having no oblique lines are the outputs from the port 4, and parts having oblique lines are the outputs from the port 6.

The relay bus controller unit 5 delivers the send request signal BR1 via the port 4 and simultaneously receives the busy signal BSY via the port 4, as indicated by an arrow in FIG. 7. At the same time that the relay bus control unit 5 receives the bus grant signal BG from the port 6 via the port 4, the busy signal BSY from the port 6 ends as indicated by an arrow. As described above, when the relay bus controller unit 5 receives the bus grant signal BG from the port 6, it has already received the bus grant signal BG from the port 3. Therefore, on condition of the existence of the bus grant signals BG of both the ports 3, 4, the unit 5 stops the delivery of the send request signal BR1 and supplies both the ports 3, 4 with the busy signals BSY signifying the establishment of the bus mastership, as indicated by an arrow in FIG. 7. Thus, when the bus grant signal BG from the opposite port 6 turns "off", the relay bus controller unit 5 changes the output of the control signal CTL from "1" to "0" to shift to the data transfer operation. In the case where the bus grant signals BG are not sent back from both the ports 3, 4, the bus is in the state in which the busy signal BSY is held "on". Therefore, the relay bus controller unit 5 decodes that the bus is occupied, and it performs the bus control request sequence from the beginning again.

FIG. 7 illustrates the case where the bus grant signal BG has turned "off" immediately. In a case where the bus grant signal BG does not turn "off", the port 4 has established the bus mastership toward the port 6, and hence, the turn-off of the bus grant signal BG is awaited. The course of operations until the turn-off of the bus grant signal BG is as stated below.

The relay bus controller unit 8 detects the "off" condition of the send request signal BR2 received from the port 6, and relays it to the port 7 in the form of the "off" value of the send request signal BR1. The relay bus control unit 8 has already recognized that the port 7 is an end terminal, by the inaction detecting operation. Now that the send request signal BR1 has turned "off", the unit 8 deems that the bus grant signal BG from the port 7 has turned "off", and it relays and delivers the "off" value of the bus grant signal BG to the port 6.

In this manner, the "off" condition of the bus grant signal BG is relayed from the port 7 to the port 6 and then to the port 4 and is supplied to the relay bus controller unit 5 of the processor 11.

The respective ports having turned "off" the bus grant signal BG recognize that an agreement has been reached on the single bus, and they await the start of the data transfer from the processor 11; namely, that the control signal CTL is turned "off" to establish the data transfer mode.

Also in the port 3, it is similarly deemed that the bus grant signal BG has turned "off". Now that the bus grant signals BG of both the ports 3, 4 have been turned "off", the relay bus controller unit 5 recognizes that the preparation for the data transfer of the bus had ended, and it turns "off" the control signals CTL of both the ports 3, 4 to start the data transfer.

The respective ports 3, 4, 6, 7 and the relay bus controller unit 8 having received the "off" condition of the control signals CTL will relay the "off" condition thereof to the terminals of the bus in accordance with a relay procedure similar to the above. In this manner, the bus is brought from the control (CTL) mode to the data transfer mode, and the transfer of data is started.

FIG. 8 is an operating time chart in the case where requests for data transfer have come into contention in the control (CTL) mode; that is, where the send request signals BR1 have been supplied from the two ports 4, 6 almost simultaneously. First, the send request signal BR1 is provided from the processor 11, and secondly, the send request signal BR2 is provided from the processor 12. In the same manner as the case of the single signal source, the busy signal BSY is cut off.

Next, when the bus contention condition has been detected by a processor upon the delivery of the send request signals BR1 and BR2 to the bus, the contention signal BCNTN is delivered to the bus. For example, when the processor 12 has sensed the contention between requests by sensing BR2 at a time it is sending BR1, it provides the bus contention signal BCNTN immediately and turns "off" the send request signal BR1 simultaneously. Since FIG. 8 is the time chart viewed from the side of the processor 11, the signal BR2 is the send request signal from the processor 12.

As the contention signal BCNTN is relayed through the bus, the other ports also sense the presence of a contention for the bus. Upon sensing the contention condition, the relay bus controller units 5, 8 turn "off" the send request signals BR1 and thereafter rerun data transfers on condition that the bus has been cleared; namely, that the send request signals BR1, BR2, the bus contention signals BCNTN, the bus grant signals BG, etc., have been turned "off".

In order to avoid a repeated clash during the rerun of this data transfer and to perform data transfers as equally as possible among the processors, the data bus is supplied with a request factor (RF) which is determined by, e.g., a waiting time after the generation of data within the processor; namely, a priority processing level signal, whereby one processor falls into the receiving status with its send request postponed. Thenceforth, the procedure shown in FIG. 7 is repeated to establish the data transfer mode. When the request factors (RF) of both the processors in contention are equal, data is transferred in a predetermined preferential direction.

Figure 18:
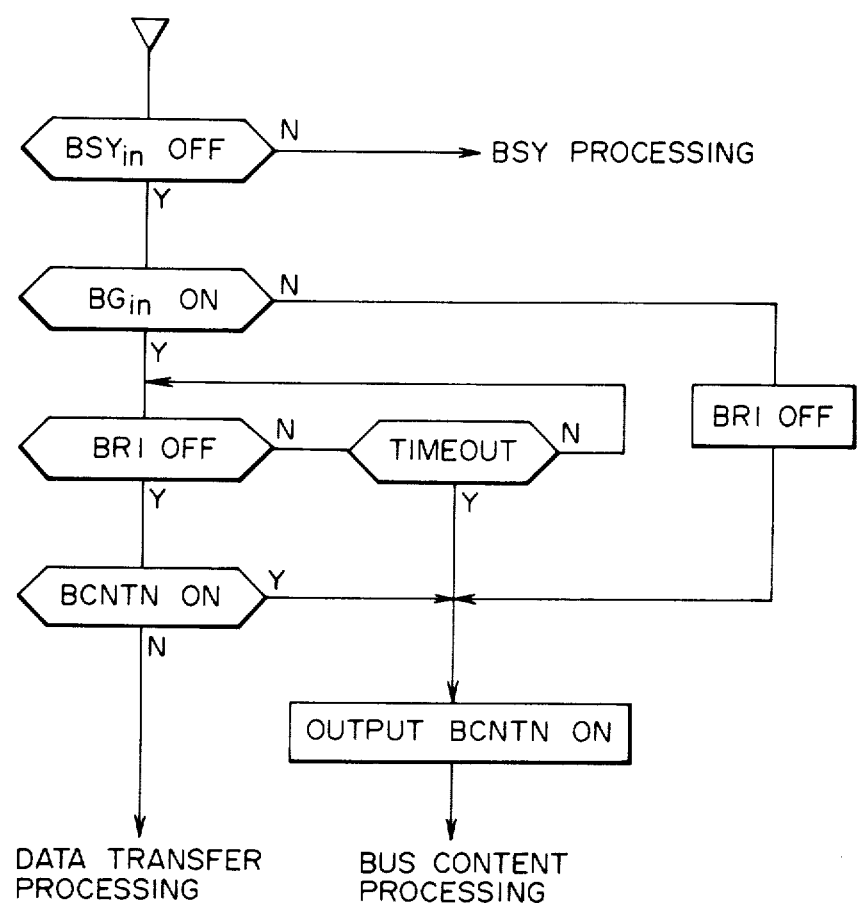

Next, a description will be provided concerning the sequence of the bus contention detection. FIG. 18 illustrates the flow chart of the bus contention detection.

Whenever the processor wishes to send data, the bus request signal BR1 is delivered to the bus, and then, there arises two responses in the processor on the identical cluster bus. One response is that the processor receives BR2, and the bus grant signal BG output of the processor is delivered to the bus. The other response is that the bus request signal BR1 of the processor on the identical cluster bus is delivered to the bus almost at the same time. Therefore, either two bus request signals BR1, or one bus request signal BR1 and one bus grant signal BG are delivered to the same bus simultaneously, and thus, the busy signal BSY is turned "off", suppressed by the bus request signal BR1 or the bus grant signal BG. That is, if the busy signal BSY on the bus has been turned "off", the bus request signal BR1 or the bus grant signal BG has already been delivered to the bus between the adjacent processors on the identical cluster bus.

Accordingly, as illustrated in FIG. 18, if the busy signal BSYin is sensed and BSYin signal is "OFF", it is decided if the bus grant signal BGin is "ON" or not. If the bus grant signal BGin if "OFF", both the adjacent processors on the identical bus have delivered the bus request BR1 to each other; namely, each processor should detect the bus contention and the bus request BR1 is turned "OFF", and the bus contention detect signal BCNTN output of each processor is turned "ON" and each processor starts to process the bus contention.

Meanwhile, if the bus grant signal BGin is "ON", the bus request signal BR1 output of the sending processor is turned "OFF" and since the request signal BR1 "OFF" is relayed and delivered by the receiving processor, the respective receiving processor waits until the bus request signal BR1 is turned "OFF". If the bus request signal BR1 is turned "OFF" within a predetermined waiting time, regarded as a bus contention, the bus contention detect signal BCNTN is turned "ON", and the bus contention processing is started.

Next, if the bus request signal BR1 is turned "OFF", the processor has been reached, but if the bus request signal BR1 from two or more than two processors separated two or more than two nodes distant is delivered simultaneously, in one bus the bus contention is not detected but somewhere in the other buses the bus contention is necessarily detected. Since the bus contention signal BCNTN which is delivered by the processor detecting the bus contention is successively relayed and delivered, it is decided if the bus contention signal BCNTN is "ON", and in case of no contention, the normal data transfer processing is started. In the case the bus contention signal BCNTN is "ON", the bus contention signal is relayed and delivered to the bus through the relay control unit and the bus contention processing is started.

Figure 9:
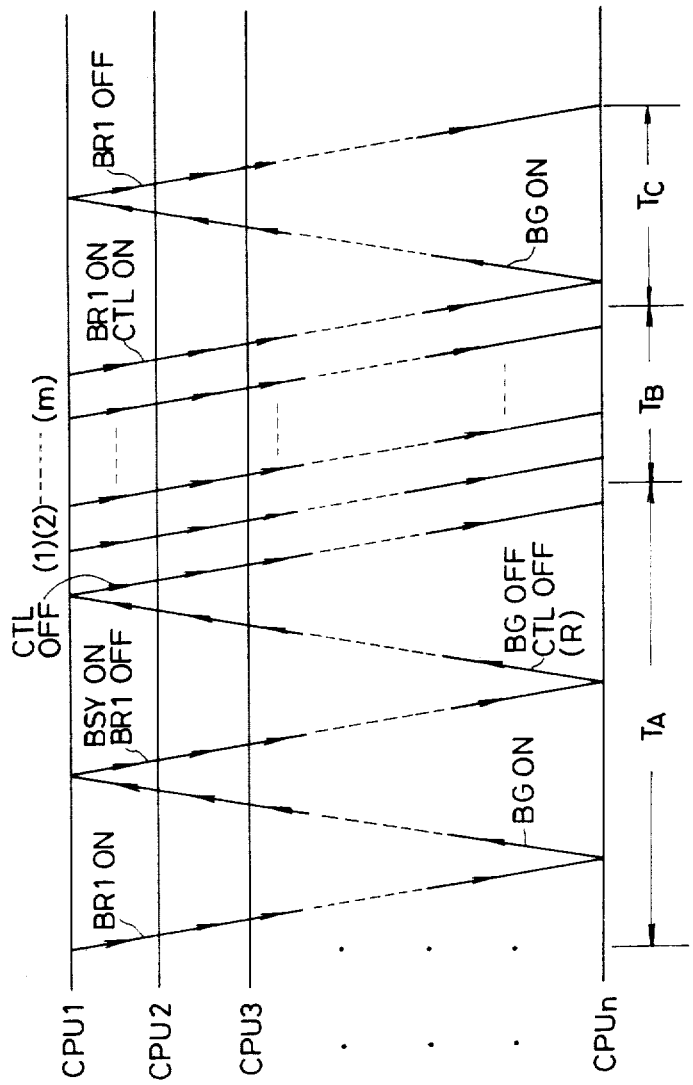
FIG. 9 is a sequence chart of an embodiment of a bus control order according to the present invention.

FIG. 9 is a signal transmission sequence chart in an embodiment of the bus control system of the present invention, and illustrates a transmission control order in the case where n processors are connected.

In the data transfer mode, the signals BR1, BR2 function as sending strobes, respectively, and the signal BG functions as a receiving strobe. At the same time that the processor 11 supplies data, the sending strobe BR1 is delivered, and at the same time that the processor 11 is supplied with data, the receiving strobe BG is delivered.

When the data transfer has ended in this order, the control signal CTL is provided again to bring the bus into the control mode, and simultaneously, the transfer post-processing is performd in the same order as in the pre-processing. Then, the data transfer control is completed.

In FIG. 9, $T_A$ designates the control mode which effects the transfer pre-processing, $T_B$ the data transfer mode which effects data transfer, and $T_C$ the control mode which effects the transfer post-processing.

In the illustration of FIG. 9, the processor 11 is the sending source of data. In the control mode $T_A$ for the transfer pre-processing, the processor 11 turns "on" the send request signal BR1 and delivers it to the processor 12 which is connected by the identical bus on the identical cluster bus. The processor 12 relays this send request signal BR1 to the processor 13 which is adjacent thereto on the identical cluster bus. Likewise, the send request signal BR1 is relayed from the processor 13 to the terminal processor 1n. Since no opposite processor is connected to the terminal port, the processor 1n detects inaction and turns "on" the bus grant signal BG and delivers it in the reverse direction. Also, this grant signal BG is successively relayed to the adjacent processors on the identical cluster bus until it is transmitted to the processor 11.

Upon receiving the "on" condition of the bus grant signal BG, the processor 11 being the signal source decides that an agreement on the use of the bus has been reached. It turns "off" the send request signal BR1, and simultaneously turns "on" the busy signal BSY for asserting the bus mastership and delivers it. The "off" condition of the send request signal BR1 and the "on" condition of the busy signal BSY are successively relayed from the processor 11 to the processor 1n.

Upon detection of the "off" condition of the send request signal BR1, the processor 1n decides that the agreement on the use of the bus has been reached, and it turns "off" the bus grant signal BG. Besides, it turns "off" the control signal CTL in only the port on the receiving side, to await the time that the processor 11 on the sending side will turn "off" the control signal CTL.

Also, the "off" condition of the bus grant signal BG and the "off" condition of the control signal CTL on the receiving side are successively relayed, and sent back to the processor 11. Thus, upon receiving the "off" state of the bus signal BG, the processor 11 decides that the preparation of the bus for transfer has been completed, and it turns "off" the control signal CTL to establish the data transfer mode $T_B$. Upon acknowledging that the bus has fallen into the data transfer mode, the processor 11 starts the transfer of data.

Since the "off" condition of the control signal CTL is successively relayed, all the processors 12 - 1n fall into the data transfer mode and receive the data of the 1st byte to the m-th byte which is sent from the processor 11.

In the data transfer mode $T_B$, when sending and receiving data, the respective processors deliver the sending strobes BR1 simultaneously with supplying the ports with the data and deliver the receiving strobes BG simultaneously with being supplied with the data.

When sending the data to the bus, the processor delivers the sending strobe BR1 and thereafter receives the receiving strobe BG. Thus, it can discriminate that the opposite processor has read the data. Subsequently, it waits in a status for receiving data which the opposite processor sends back. Upon the delivery of the sending strobe BR2 of the opposite processor and its own receiving strobe BG, the source processor reads the data sent back from the opposite processor so as to acknowledge that its own sent data and the received data of the opposite processor coincide.

In the case of coincidence, the processor 11 sends the next data, and it acknowledges that the data has been certainly transmitted to the opposite processor, through the same procedure as in the above case. In a case where the data are not coincident or where the opposite processor does not respond, the source processor senses a data transmission abnormality and immediately establishes the control mode $T_C$ so as to start the transfer post-processing.

On the other hand, the processor in the receiving status receives the data given from the sending side, in the order reverse to that of the sending processor, and it relays and delivers the data to the port opposite to the port having received the data. The relay and delivery of the data is performed in accordance with the same procedure as performed in the sending side processor.

When the sending of all the data has been completed in this way, the sending side processor 11 turns "on" the control signal CTL to bring the bus into the control mode $T_C$ and also turns "on" the completion request signal BR1 and delivers it in order to start the transfer post-processing operation.

Thenceforth, the "on" condition of the completion request signal BR1 is relayed from the processor 11 to the processor 1n in the same manner as in the transfer pre-processing. Then, the processor 1n turns "on" the acknowledge signal BG for the completion of the bus transfer and relays it toward the sending side processor 11.

Upon receiving the relayed signal BG, the sending side processor 11 decides that the completion of the data transfer has been acknowledged in all the processors, and it turns "off" the completion request signal BR1 to complete the whole sequence of the transfer and to clear the bus. Thenceforth, the plurality of processors 12—in relay the "off" condition of the signals BR1 similarly, to complete transfer sequences in succession.

Figure 10A:
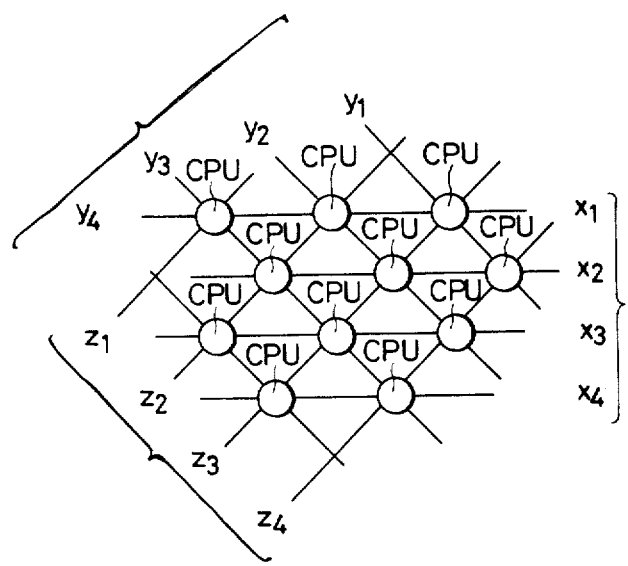
FIGS. 10a and 10b are a schematic setup diagram and a detailed setup diagram of another embodiment of the multiprocessor system according to the present invention, respectively.

FIG. 10a is a setup diagram of another embodiment of the multiprocessor system according to the present invention. Cluster buses, each of which is composed of the plurality of processors 11—in arranged rectilinearly as shown in FIG. 2, are arranged in the shape of a lattice having n directions (n=0, 1), whereby a multiprocessor system having cluster buses in n directions is constructed. FIG. 10a illustrates a specific multiprocessor system in which the cluster buses extend in three directions (n =3), and the x-direction (x1-x4), y-direction (y1-y4) and z-direction (z1-z4) are indicated as parts thereof.

Figure 10B:
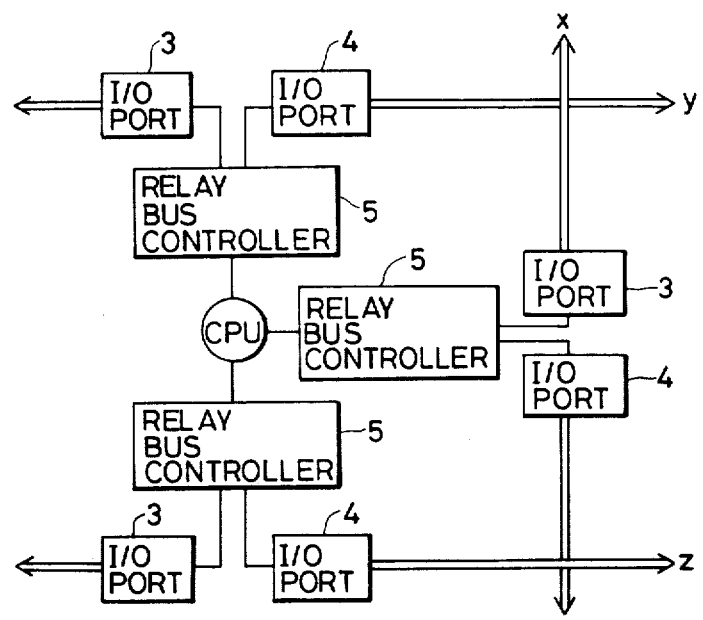

FIG. 10b shows the setup of each processor in FIG. 10a. I/O ports 3, 4 and a relay bus control unit 5 are disposed for each of the cluster buses in the x-, y- and z-directions, and the processor exchanges signals with the cluster buses x, y and z via the respective relay bus control units 5. When output data is generated, the processor supplies the send request signal BR1 to the relay bus control unit 5 of the cluster bus with which an opposite processor is connected, and it performs the transmission control procedure described before. Thereafter, it sends the data.

With the cluster buses extending in the individual directions, data can be simultaneously transferred among the plurality of processors as a single bus. Further, since the cluster buses are divided in correspondence with the processors, any trouble in one processor in the multiprocessor system composed of the plurality of cluster buses does not affect the other processors, and the whole system does not go down. Moreover, since the cluster buses are divided in correspondence with the processors and each pair of processors monitor the other processor through an individual bus, maintenance is permitted in a processor unit at any desired time, and the maintainability of the system is high. Besides, since all the processors have the same constructions, the system exhibits a high extensibility.

As set forth above, according to the present invention, a construction in which one pair of processors are coupled by a single bus is used as a unit, a plurality of such units are serially arranged to be rectilinear, the plurality of rectilinear buses in which the individual buses are divided by the processors are controlled as one cluster bus, and such cluster buses are arranged in the shape of a lattice having n directions when viewed in plan, to construct a multiprocessor system.

Since the function of a bus arbiter is dispersed among the bus control devices of the respective processors, a bus arbiter form controlling the whole bus is dispensed with, thereby avoiding the fear that a bus arbiter will form a bottleneck in the system.

In addition, owing to the division of the bus by the respective processors, even when trouble occurs in one processor, another processor cuts off the corresponding bus, whereby the trouble does not affect the other processors, and the whole system does not go down. Furthermore, since one pair of processors monitor each other and can promptly sense the trouble, maintenance is possible at any desired time irrespective of the operative status of the system.

While we have shown and described several embodiments in accordance with the present invention, it is undetstood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A method of configuring and operating a processor communication bus by way of which a plurality of processors communicate with one another comprising the steps of:

providing a cluster communications bus in the form of a plurality of successive bus segments, each respective bus segment being disposed between successively adjacent ones of said plurality of processors;

providing a respective bus controller between successively adjacent ones of said bus segments, each respective bus controller intercoupling succesively adjacent ones of said bus segment and being coupled to a respective one of said plurality of processors;

in response to one of said processors desiring to transfer data by way of said cluster communications bus, supplying to said cluster bus a send request and priority processing level signal; and relaying, along the cluster bus in a downward direction from a bus controller associated with a processor in a data transfer mode, via each bus controller associated with a processor not in a data transfer mode, first bus control signals generated by a logical OR operation between said request signal relayed from a processor and a send request signal to be relayed from the next processor in the downward direction and between said level signal relayed from said processor and said level signal to be relayed from said next processor in the downward direction; relaying, along the cluster bus in an upward direction to said bus controller associated with a prcoessor in a data transfer mode, via each bus controller associated with a processor not in a data transfer mode, a second bus control signal generated by a logical AND operation between a receipt acknowledge signal relayed from a processor and a receipt acknowledge signal to be relayed from the next processor in the upward direction, in response to receipt of a send request and priority processing level signal from a prcoessor, and effecting, at the same time, the transfer of data from said one processor, which has supplied a send request and priority processing level signal to the cluster bus and has received a request acknowledge signal therefrom to all other processors on said cluster bus via their respectively associated bus controllers.

2. A method according to claim 1, wherein a plurality of processors are serially connected rectilinearly by said bus segments via said bus controllers to form said cluster bus which is arranged in one direction and wherein a plurality of such cluster buses are arranged in a plurality of directions in a lattice pattern.

3. A method according to claim 1, wherein, in response to at least two of said processors having simultaneously applied to said cluster bus a bus request and priority processing level signal, causing each processor to compare the priority processing level signals supplied from the other processors with its own priority processing level signal, and acquiring the right to transmit on the condition that it has the highest priority processing level.

4. A method according to claim 3, wherein, in the event of competition for a send request, the processor having the highest priority processing level retransmits the send request and the priority processing level signal to confirm that other processors are ready for receiving data and supplies these signals again and then awaits the receipt acknowledge signal from another processor on the same cluster bus and establishes the right to transmit by receiving said receipt acknowledge signal.

5. A method according to claim 1, wherein each processor repeats a bus transmission control procedure starting from the acquisition of the right ot retransmit when, after data transfer, it has detected failure in the occupation of the bus sending data or failure in data transfer.

6. A method of configuring and operating a processor communication bus by way of which a plurality of processors communicate with one another comprising the steps of:

providing a cluster communications bus in the form of a plurality of successive bus segments, each respective bus segment being disposed between successively adjacent ones of said plurality of processors;

providing a respective bus controller between successively adjacent ones of said bus segments, each respective bus controller intercoupling succesively adjacent ones of said bus segment and being coupled to a respective one of said plurality of processors;

in response to one of said processors desiring to transfer data by way of said cluster communications bus, supplying to said cluster bus a send request and priority processing level signal; and relaying, along the cluster bus, via each bus controller associated with a processor not in a data transfer mode, a receipt acknowledge signal in response to receipt of a send request and priority processing level signal from a prcoessor, and effecting, at the same time, the transfer of data from said one processor, which has supplied a send request and priority processing level signal to the cluster bus and has received a request acknowledge signal therefrom to all other processors on said cluster bus via their respectively associated bus controllers wherein, in response to a bus controller associated with a processor which has received a send request signal relayed sequentially from other processors through other bus controllers, having relayed said send request signal to the cluster bus and the processor has not received a response signal from the cluster bus within a predetermined period of time, identifying the adjacent processor as being abnormal and causing the processor which has sensed the abnormality to recognize its position as being the end of the cluster bus and causing a processor which has recognized that it is located at an end of the cluster bus to send back said receipt acknowledge signal on said cluster bus upon receiving the send request and priority processing level signal from another processor, and when it has sensed that it is normally connected to an adjacent processor by receiving, within a predetermined period of time, the response signal corresponding to the send request relayed to the cluster bus, causing the send request and the priority processing level signal to be relayed in a sending direction and relaying the receipt acknowledge signal in a sending source direction to the cluster bus.

* * * * *